United States Patent

[11] 3,626,899

| [72] | Inventor | Frederick R. Spellman |
| | | Blue Bell, Pa. |
| [21] | Appl. No. | 54,788 |
| [22] | Filed | July 14, 1970 |
| [45] | Patented | Dec. 14, 1971 |
| [73] | Assignee | Spellman & Zenon Products Corporation |
| | | Blue Bell, Pa. |

[54] TRAINING PADS FOR YOUNG DOGS
6 Claims, 3 Drawing Figs.

[52] U.S. Cl. .................................................. 119/1,
128/290, 424/310
[51] Int. Cl. ...................................................... A01k 67/00
[50] Field of Search .......................................... 119/1, 29,
28; 424/311, 310; 128/284, 290

[56] References Cited
UNITED STATES PATENTS

| 2,967,128 | 1/1961 | Kare | 424/310 |
| 3,284,273 | 11/1966 | Prentice | 161/83 |
| 3,386,417 | 6/1968 | Machowski | 119/1 |
| 3,559,650 | 2/1971 | Larson | 128/290 |
| 3,521,624 | 7/1970 | Gander et al. | 128/284 X |

Primary Examiner—Aldrich F. Medbery
Attorney—Synnestvedt & Lechner

ABSTRACT: Absorbent material lined on one side thereof with fluid impervious material is impregnated with an odor imparting substance which attracts young dogs to the pads for the purpose of urination and defecation and discourages chewing of the pad by the young dog.

Patented Dec. 14, 1971
3,626,899
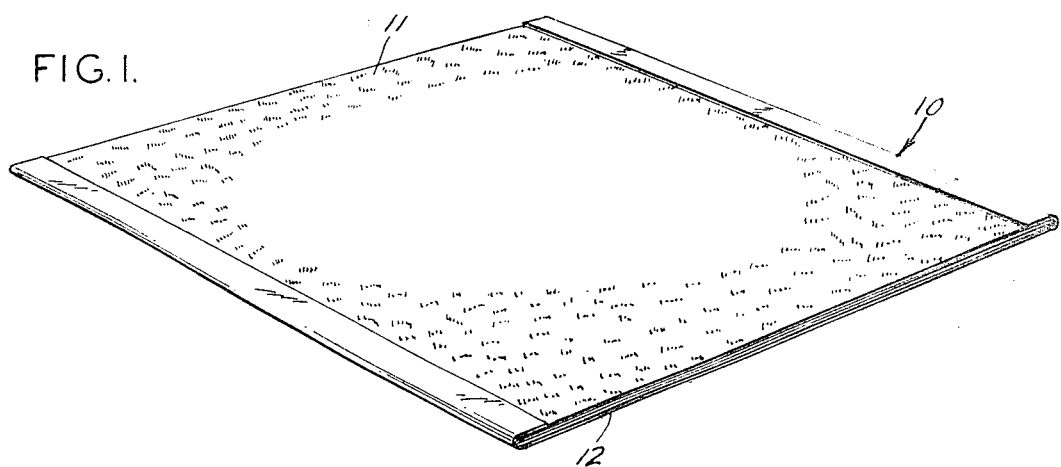
FIG.1.
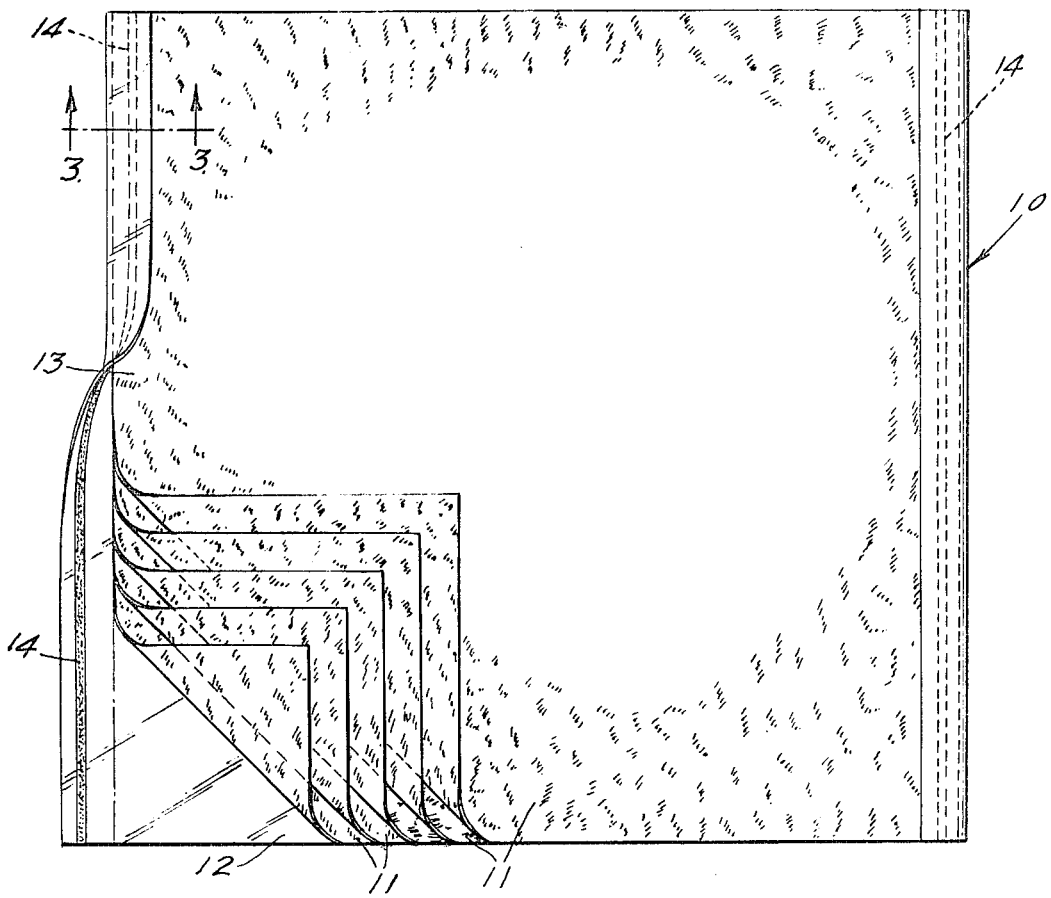
FIG.2.
FIG.3.
INVENTOR:
FREDERICK R. SPELLMAN
BY
Howson & Howson
ATTYS.

TRAINING PADS FOR YOUNG DOGS

BACKGROUND OF THE INVENTION

Prior Art

The owners of young dogs are always faced with the problem of teaching the young dog that the proper place for urination and defecation is outside the home; that is, they must go through the steps of what is commonly referred to as "housebreaking"'d the young dog.

The traditional method of housebreaking a young dog involves the use of newspapers. In this method, newspapers are placed on the floor and the animal is instructed that he is to utilize the newspaper for urination and defecation, usually through a system of rewards and punishments. The use of newspaper suffers from the disadvantage that the newspaper tends not to absorb urine immediately, that is, until the newspaper becomes wet, any urine applied to it tends to immediately run off the newspaper. In addition, even when wet, urine tends to run off the paper when applied in relatively large amounts over a short period of time, such as would occur when a young dog uses the newspaper for urination. Furthermore, even though the newspaper does absorb the majority of the urine expelled by the animal, this does not prevent wetting the underlying floor material by the urine. Thus, the use of newspapers for training purposes entails removal of the used newspaper and cleaning of the underlying floor area. To insure satisfactory cleaning and destruction of bacteria, etc., it is necessary to apply a germicide to the floor area, thus considerably decreasing the convenient of the use of newspapers as a training tool.

Frequently, it is difficult for the young dog to appreciate the significance of the carefully placed newspaper and many accidents occur. To avoid this problem, various materials have been placed on the market which have odors which are attractive to young dogs. Placing these substances on the newspaper is said to entice the young dog to the newspaper. However, in addition to attracting the animal to the paper for the purpose of urination, the animal frequently, attracted by the odor, chews up and destroys the newspaper, both before and after it has been utilized for its intended purpose. Moreover, some of these substances suffer from the disadvantage that they attract not only the young dog, but also any mature dogs in the household. Thus, it is possible that the use of these substances could result in undoing the previous training of the older dog.

There are also various products designed to be applied to furniture, carpets and etc. to repel young dogs and thereby prevent them from utilizing these objects as a place for urination and defecation. These products also serve to prevent young dogs from chewing the furniture, etc., also a common predilection of young dogs not appreciated by their owners.

It is the principal object of this invention to provide a training pad for young dogs. A further important object of the invention is the provision of a method for training young dogs to respond to the calls of nature outside their owner's home.

It is a further object of this invention to provide a training pad impregnated with an odor imparting substance which attracts the young dog to the pad for the purpose of urination and defecation, but which discourages the desire to chew and destroy the training pad.

Another object of this invention is to provide a training pad for young dogs impregnated with an odor imparting substance which attracts young dogs to the pad for the purpose of urination and defecation, but which discourages the desire to chew and destroy the training pad and is unattractive to mature, housebroken dogs.

It is also an object of the invention to provide a pad which is absorbent, but which is also impervious to fluids on one side thereof, thereby preventing transfer of fluid from the pads to the underlying floor area.

Still another object of the invention is to provide a training pad for young dogs which is economical to produce and easy to dispose of.

SUMMARY OF THE INVENTION

The present invention relates to a training pad for young dogs comprising absorbent material having a lining of fluid impervious material on one side thereof; said absorbent material having impregnated thereon an odor imparting substance which attracts young dogs to the pad for the purpose of urination and defecation while at the same time discouraging chewing or other destruction of the pad by the young dog. The invention also provides a method for housebreaking young dogs.

DETAILED DESCRIPTION OF INVENTION

Field of Invention

This invention relates to a training pad for young dogs and to a method for housebreaking young dogs.

As used herein, the phrase "young dog" refers to those canine animals commonly referred to as puppies, and is intended to include dogs from the age they are weaned until they reach maturity, which usually occurs at about 10 to 12 months of age. The word "housebreaking" as used herein means the training of a young dog to refrain from urination and defecation within the confines of its owner's residence and to seek the outdoors as the proper place for responding to the calls of nature. In the drawings, which will be discussed in more detail hereinafter, FIG. 1 is a perspective view of the training pad for young dogs;

FIG. 2 is an enlarged plan view of the training pad for young dogs illustrating multiple layers of absorbent material and a method for binding the fluid impervious layer to the absorbent material; and FIG. 3 is a fragmented sectional view taken along lines 3—3 of FIG. 2.

As stated above, the training pads for young dogs of this invention comprises absorbent material lined on one side thereof with a fluid impervious material and being impregnated with an odor imparting substance which attracts young dogs to the pad for the purpose of urination and defecation yet discourages the chewing of the training pad by young dogs.

The absorbent material can be any material capable of absorbing fluids basically aqueous in nature such as the urine of young dogs. Cellulosic materials, preferably in the form of multiple layers, are the preferred absorbent material. The useful criteria for the absorbent material are that it be highly absorbent and yet that it be economical to produce. A training pad having, for example, multiple layers of cellulosic paper weighing in total about 50 grams has been found to be capable of absorbing about 400 cc. of fluid. Cellulosic wadding would be unacceptable as the absorbent material in this invention because, in the event that a young dog should chew the pad, the ingested wadding could cause blocking of the intestinal tract of the young dog.

The fluid impervious lining or backing applied to one side of the absorbent material may be any material which is impervious to fluids such as urine and may be, for example, a thin layer (approximately 0.001 inch thick) of polyethylene or polypropylene or other plastic materials. It is preferred that the thin backing sheet exceed the size of the absorbent material in one dimension to provide means for sealing the backing sheet to the absorbent material to prevent separation and to maintain the position of one relative to the other.

As illustrated in FIG. 2, the training pad 10 may be constructed by forming multiple layers of absorbent material 11, backed with a thin back sheet of impervious polyethylene 12 and adhesively uniting the absorbent material 11 and the back sheet 12 along area 13. The adhesion of thin back sheet 12 to absorbent material 11 may be accomplished by any suitable means known to the art, one method being incorporating a layer of a heat sealable adhesive 14 to the edge of thin back sheet 12, which with the application of heat causes the desired heat seal to be formed. In a preferred embodiment of this invention, the training pad is 23 inches by 24 inches, a size found to be desirable for training purposes.

As stated above, the training pads are impregnated with an odor imparting substance which attracts the young dog to the pad for the purpose of urination and defecation but which also discourages any desire of the young dog to chew up and destroy the training pad. For example, the training pads can be impregnated with from about 0.05 percent to about 1 percent, preferably from about 0.2 percent to about 0.5 percent, by weight, based on the total weight of the training pad of allyl phenyl acetate. The allyl phenyl acetate imparts a characteristic odor to the training pad, which attracts young dogs to the pad, for the purpose of urination and defecation but which also discourages any desire of the young dog to chew up and destroy the training pad. Equally important is the fact that while the odor of allyl phenyl acetate is attractive to young dogs, encouraging them to utilize the training pads for urination and defecation, it has been found that it has little, if any, attraction for mature, housebroken dogs and, thus, does not create the problem of undoing previous training of an older dog with the training of a younger dog.

The training pads may be impregnated with the allyl phenyl acetate in any convenient manner; for example, the allyl phenyl acetate may be incorporated into an oily vehicle such as light or heavy mineral oil and applied to the training pads. Application may be accomplished by simple spraying operations or the allyl phenyl acetate may be applied as a mist or fog or sprinkled or dropped onto the training pad. Of course, the best results are obtained by applying the allyl phenyl acetate directly to the absorbent material in the training pad and this could be accomplished prior to incorporating the absorbent material into the impervious liner.

The training pads of this invention may be utilized to housebreak a young dog by simply placing the training pads on the floor, with the fluid impervious lining next to the floor. The young dog is then taught to use the pad as the place for urination and defecation. The characteristic odor of the pad aids in attracting the young dog to the pad. When the animal has learned to utilize the training pad for its intended purpose indoors, then the training pads are placed outside and the animal will begin to understand the real objective of his training.

It is obvious that the training pads of the invention are particularly well suited for their intended purpose. The fluid impervious backing prevents transfer of fluid, etc. from the absorbent material to the underlying floor area thereby preventing permanent staining, discoloration and contamination of floors and carpets. After use, the pads can simply be enclosed within the fluid impervious backing and neatly disposed of.

While the training pads of this invention are especially useful in the housebreaking of young dogs, it is obvious that they are suitable for other applications. For example, they may be utilized as cage liners when animals are caged for shipping, and, they are useful for animals which are confined indoors for long periods of time or those animals which live indoors exclusively. They may also be used to train older dogs which have never been housebroken.

What is claimed is:

1. A training pad for young dogs which comprises a pad of absorbent material, lined on one side thereof with fluid impervious material and impregnated with an odor imparting substance which attracts young dogs to the pad for the purpose of urination and defecation while discouraging the desire of the young dog to chew the pad wherein said odor imparting substance comprises allyl phenyl acetate.

2. A training pad for young dogs according to claim 1 wherein the allyl phenyl acetate is in an amount of from about 0.05 percent to about 1 percent by weight, based on the weight of the pad.

3. A training pad for young dogs according to claim 2 impregnated with from about 0.2 percent to about 0.5 percent, by weight, based on the weight of the pad, of allyl phenyl acetate.

4. A method for housebreaking young dogs which comprises placing in a convenient location a training pad of absorbent material, lined on one side thereof with fluid impervious material and impregnated with an odor imparting substance comprising allyl phenyl acetate which attracts young dogs to the pad for the purpose of urination and defecation while discouraging the desire of the young dog to chew the pad and training the young dog to utilize the pad for the purpose of urination and defecation.

5. The method of claim 4 wherein the training pad is impregnated with from about 0.05 percent to about 1 percent, by weight, based on the weight of the pad, of allyl phenyl acetate.

6. The method of claim 5 wherein the training pad is impregnated with from about 0.2 percent to about 0.5 percent, by weight, based on the weight of the pad, of allyl phenyl acetate.

* * * * *